United States Patent
Wallinger et al.

(10) Patent No.: US 8,814,227 B2
(45) Date of Patent: Aug. 26, 2014

(54) LATCH FOR A MOTOR-VEHICLE HEADREST

(75) Inventors: Thomas Wallinger, Bodenwoehr (DE); Manfred Schenkl, Sulzbach-Rosenberg (DE); Josef Meier, Freudenberg (DE); Eberhard Luber, Illschwang (DE)

(73) Assignee: Grammer AG, Amberg (DE)

( * ) Notice: Subject to any disclaimer, the term of this patent is extended or adjusted under 35 U.S.C. 154(b) by 617 days.

(21) Appl. No.: 12/390,695

(22) Filed: Feb. 23, 2009

(65) Prior Publication Data
US 2009/0230702 A1     Sep. 17, 2009

(30) Foreign Application Priority Data

Feb. 28, 2008   (DE) .................. 10 2008 011 560

(51) Int. Cl.
*E05C 3/06* (2006.01)
*B60N 2/44* (2006.01)
*B60N 2/48* (2006.01)

(52) U.S. Cl.
CPC .............. *B60N 2/4885* (2013.01); *B60N 2/442* (2013.01); *B60N 2/4864* (2013.01)
USPC ....................................... 292/200

(58) Field of Classification Search
CPC ...... B60N 2/4885; E05B 17/0025; E05B 1/14
USPC ............. 297/216.12, 408, 409; 292/194, 201, 292/216, 219, 220, DIG. 23; 49/280; 296/68.1
See application file for complete search history.

(56) References Cited

U.S. PATENT DOCUMENTS

| | | | | |
|---|---|---|---|---|
| 2,985,229 A | * | 5/1961 | Shamblin | 297/410 |
| 4,923,250 A | * | 5/1990 | Hattori | 297/410 |
| 4,977,973 A | * | 12/1990 | Takizawa | 180/271 |
| 5,484,189 A | * | 1/1996 | Patterson | 297/410 |
| 5,590,933 A | * | 1/1997 | Andersson | 297/408 |
| 6,074,011 A | * | 6/2000 | Ptak et al. | 297/408 |
| 6,623,073 B2 | * | 9/2003 | Schafer et al. | 297/216.12 |
| 6,761,403 B2 | * | 7/2004 | Pal et al. | 297/216.12 |
| 6,863,343 B2 | * | 3/2005 | Pal et al. | 297/216.12 |
| 6,902,232 B2 | * | 6/2005 | Kamrath et al. | 297/61 |

FOREIGN PATENT DOCUMENTS

DE     19830407     1/2000
DE      1019160     9/2002

* cited by examiner

*Primary Examiner* — Kristina Fulton
*Assistant Examiner* — Nathan Cumar
(74) *Attorney, Agent, or Firm* — Andrew Wilford

(57) ABSTRACT

A latch secures an element such as a motor-vehicle headrest for movement relative to a support between a rest position and an advanced position. A pivotal lever can hold the element in the rest position. A spring pushes the element into the advanced position and presses it against the lever so as to apply a torque to the lever that presses a latch formation on the lever against a retractile latch part of an actuator. If the actuator retracts the part, the lever is released and the lever can pivot to allow the spring to move the element into the advanced position.

13 Claims, 8 Drawing Sheets

LATCH FOR A MOTOR-VEHICLE HEADREST

FIELD OF THE INVENTION

The present invention relates to a motor-vehicle headrest. More particularly this invention concerns a latch for maintaining an active motor-vehicle headrest in its rest position.

BACKGROUND OF THE INVENTION

Such a latch is known from German 198 30 407 of Bender that serves to lock and unlock a roll bar that is part of an electromechanical roll-protection system. The latch has a two-armed lever that can move between a retaining position that locks a holder and one that releases the holder. One arm of the two-armed lever reaches around the holder in a retaining position and prevents movement of the roll bar into a crash-protection position. A spring urges the lever into a freeing position. A second lever is also constructed with two arms, one of which cooperates with the first lever and prevents it from pivoting into the freeing position. The second lever can be pivoted by an actuator, during which it loses contact with the first lever so that the latter can pivot freely into the freeing position. This state of the art has the disadvantage of a relatively large space requirement.

German 101 09 160 (US equivalent U.S. Pat. No. 6,623,073) of Schaefer describes another such system used on a so-called active motor-vehicle headrest, that is a headrest intended to move in a collision from a back rest position spaced well behind the head of the occupant of the seat on which the headrest is mounted to an advanced crash-protection position close behind the seat occupant's head. This system has a very complicated spring-loaded double-link assembly that is expensive to manufacture and prone to failure.

OBJECTS OF THE INVENTION

It is therefore an object of the present invention to provide an improved latch for a motor-vehicle headrest.

Another object is the provision of such an improved latch for a motor-vehicle headrest that overcomes the above-given disadvantages, in particular that requires less space, can be readily manufactured and mounted and has a high functional safety due to its simple construction.

SUMMARY OF THE INVENTION

A latch for securing an element relative to a support has according to the invention guides between the element and the support for movement of the element relative to the support between a rest position and an advanced position. A lever pivotal on the support about a lever axis between a retaining position and a freeing position is provided offset from the lever axis with a latch formation and offset from the lever axis and from the latch formation with a contact region. The contact region is operatively engaged with the element in the retaining position to prevent shifting of the element from the rest position into the advanced position. An actuator has a part engageable with the latch formation and displaceable between a blocking position preventing pivoting of the lever about the lever axis in at least one direction out of the retaining position toward the freeing position and an unblocking position permitting pivoting of the lever about the lever axis in the one direction out of the retaining position toward the freeing position. One or more springs urge the element from the rest position into the advanced position and for thereby press the element against the contact region. The lever axis, the contact region, and the latch formation are relatively so oriented that such pressing of the element by the spring against the contact region applies torque to the lever in the one direction and thereby presses the latch formation against the actuator part in the blocking position. Movement of the actuator part into the unblocking position thereby frees the lever to pivot into the freeing position so the element can move into the advanced position.

Thus according to the invention an element can move at least between the rest and an advanced position. A return force urges the element into the advanced position. The element can be a headrest part of a crash-active head support. The headrest part can move relative to a base part of the upholstered support between the rest and the advanced position. In the advanced position the headrest part is moved relative to the base part in the direction of the vehicle passengers so that the head of the vehicle passengers only has to traverse a short path in case of a crash. The element can be held with a latch in the rest position. The latch is then in a retaining position. If the latch moves into a freeing position the element can move into the advanced position.

The latch comprises a locking lever that can pivot about a lever axis. The lever axis can be fixed to the vehicle. The lever axis can be associated with a housing in which the latch is received. The locking lever has a latch formation and a contact region. the latch formation cooperates with an actuator. In the retaining position of the latch the actuator can be in engagement with the latch formation and prevent the locking lever from pivoting. In the freeing position the engagement between the actuator and the latch formation is released so that the locking lever can pivot unencumbered.

The contact region cooperates with a link. The link can be held firmly on the locking lever. For example, the link can be pivoted on the locking lever. Alternatively, the link can be detachably engaged with the locking lever. The link can be firmly connected to the element. Alternatively, the link can be moved out of engagement with the element.

The locking lever is arranged in a first plane running parallel to a second and optionally to further planes, in which first plane the link is arranged. As a result of this arrangement the latch takes up a relatively small space. In particular, the locking lever and the link can be constructed as flat, plate-shaped elements.

The term latch signifies in the sense of the invention a locking and unlocking device. However, it is not obligatorily necessary that the actuation lever is moved out of contact with the equipment device. The actuation lever and the equipment device can be connected to one another, for example in a non-detachable manner.

An element in the sense of the invention can be any part movably supported between a rest position and an advanced position, such as the headrest part and a safety-active head support.

The advantage of the invention is that the latch has a very low size, in particular when the levers are designed as flat, plate-shaped elements. Furthermore, the device can be readily manufactured.

As a result of the arrangement of the latch formation and of the contact region on the locking lever the holding force to be applied by the actuator can be low. In addition, as a result of the design of the locking lever a flexible arrangement of the elements of the latch is possible in a receiving space, for example a upholstered support of a head support.

The locking lever can be arranged in the retaining position of the latch in such a manner close to a dead-center position in which the entire force transferred onto the locking lever is carried by the pivot support of the locking lever so that only a low torque is produced in the locking lever.

Thus, the latch in accordance with the invention makes possible a flexible arrangement of the parts and permits simple construction since only low holding forces are produced by suitable placing and designing of the locking lever.

According to a first embodiment the link is formed by a coupling element. The coupling element can be formed by a rigid rod. Alternatively, the coupling element can be formed by a bendable slack element, for example a cable.

According to another embodiment the link is formed by an actuation lever that is pivotally connected to the locking element by a pivot support. The actuation lever can be formed by a one-armed lever that is pivotally supported by an end area on the contact region of the locking lever and cooperates with the element by another end area. Alternatively, the actuation lever can also be formed by a two- or multi-armed lever.

According to another embodiment the link is firmly connected to the element by a pivot. The link can be provided with a seat in which a shaft permanently connected to the element is received, so that the link can pivot about the shaft. The link can assume different angular positions relative to the element by means of the articulated connection between the element and link. As a result of the firm connection forces of traction and pressure can be transferred between link and element.

According to another embodiment the link comprises rest coupling means that can be brought in detachable engagement with advanced coupling means of the element. The rest and advanced coupling means can be cooperating positive elements. For example, the link can have a hook-shaped or claw-shaped area that reaches around an element of the element in the retaining position, thus preventing movement of the element. In the freeing position, the hook-shaped area is brought out of engagement with the element of the element. The element can then move into the advanced position on account of the return force.

According to another embodiment the locking lever is formed by a one-armed lever. The contact region and the latch formation are arranged on the one-armed lever. The contact arranged in the latch formation can be arranged on the locking lever such a manner that a desired transfer of force takes place between link and actuator.

According to another embodiment the latch formation is arranged radially with respect to the contact region further out on the locking lever. The actuator then acts on the locking lever with a larger lever arm than the link. By means of these features a holding force to be applied by the actuator in the retaining position in order to prevent pivoting of the locking lever can be low.

According to another embodiment the locking lever is formed by a two-armed lever. The latch formation can be located on a first lever arm and the contact region on a second lever arm. It is possible with this embodiment that the contact region and the latch formation are locally independent of one another. The first and the second lever arm can be adapted to the existing spatial conditions. If the lever arms have different lengths, a force introduced into the lever at the end of one arm can be translated into a lower or higher angular force at the end of the other arm.

According to another embodiment the actuator comprises an actuation element that can move between a blocking position and a unblocking position, which actuation element engages in the blocking position with the latch formation and in the unblocking position is moved out of engagement with the latch formation. For example, the actuation element can be arranged in the blocking position in the path of the latch formation and prevent in this manner a pivoting of the locking lever. The actuation element can be a latch pin driven by an electromagnet. The latch pin can be urged by a spring into the blocking position. The latch pin can then be moved counter to the spring force into the unblocking position by actuating the electromagnet.

According to another embodiment the locking lever, link and actuator are received in a housing. The latch can be pre-mounted in the housing and the housing subsequently mounted as a structural unit. The housing can be formed in such a manner and provided with support seats in such a manner that the locking lever, link and actuator can be arranged as desired.

According to another embodiment the actuation lever has at least one control surface that cooperates with a stop or abutment fixed to the vehicle. The degree of freedom of the actuation lever can be limited in such a manner by the cooperation of control surface and stop that the actuation lever executes a certain movement during the pivoting of the locking lever. For example, the actuation lever can be moved in such a manner that the engagement of the rest coupling means and of the advanced coupling means are separated.

According to another embodiment an angle between a connecting line of a force attack point of the return force to the pivot pin as well as a connecting line of the contact region to the pivot pin in the retaining position of the latch is less than or equal to 45°, in particular less than or equal to 30°, and in particular less than or equal to 20°. In the case of very small angles the force that is determining for the generating of a torque in the locking lever is very small. It follows from this that even the torque in the locking lever is relatively small, as result of which a low holding force results that is to be applied by the actuator.

The invention furthermore relates to a head support for vehicle seats. A non-documented head support from the state of the art comprises the base part that is firmly held on support rods. A headrest part is supported on the base part in such a manner that it can move relatively in order to be able to move from a rest position into an advanced position in case of a crash. A latch holds the headrest part in the rest position and makes a movement into the advanced position possible in case of a crash.

The invention had the problem of creating a head support for the latch that has a lesser space requirement, that can be readily manufactured and mounted and has high functional safety due to a simple constructive design.

BRIEF DESCRIPTION OF THE DRAWING

The above and other objects, features, and advantages will become more readily apparent from the following description, reference being made to the accompanying drawing in which.

SPECIFIC DESCRIPTION

Figures 1, 1A:
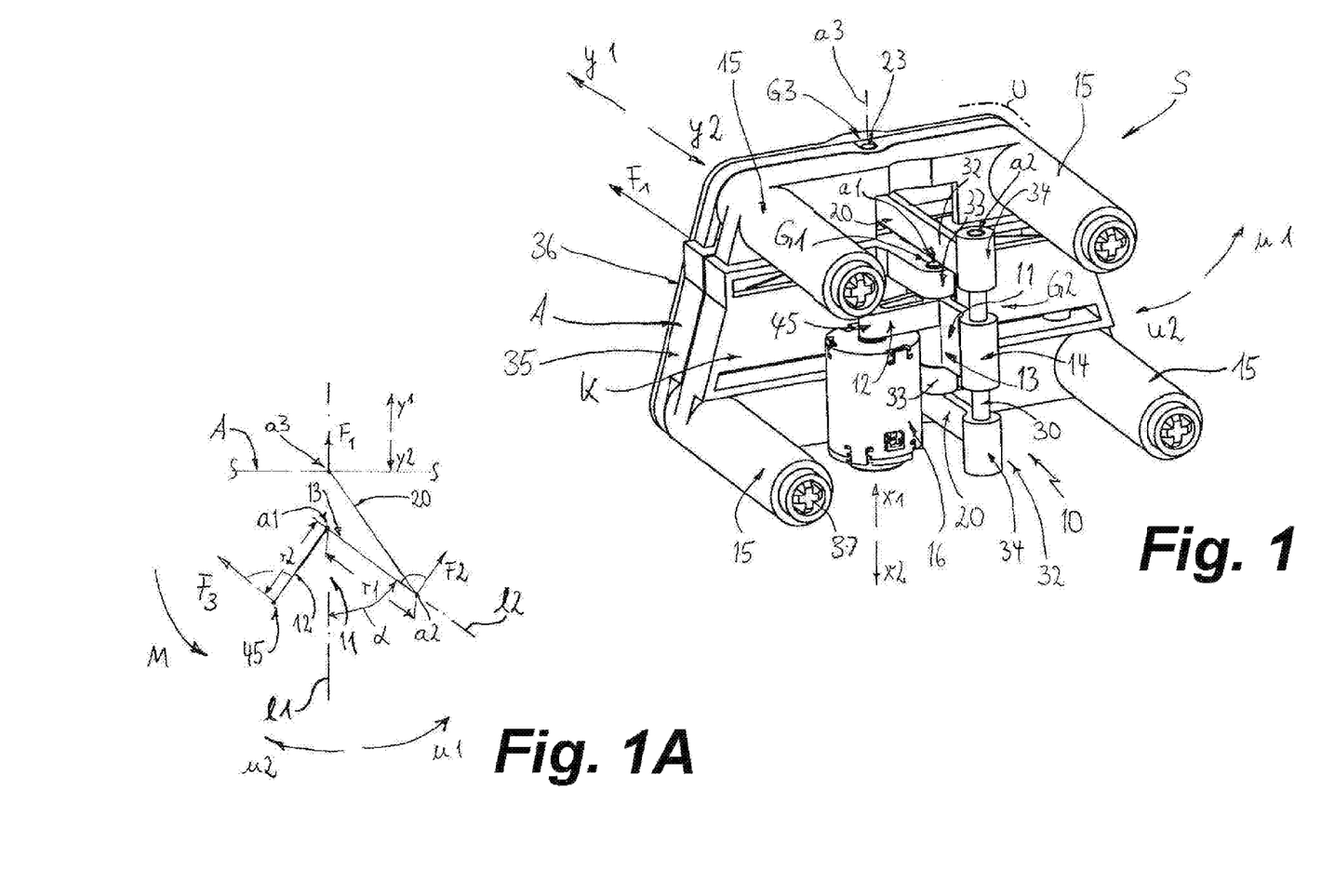
FIG. 1 is a perspective view from the rear of the basic parts of a latch according to the invention.
FIG. 1A is a diagram illustrating in top view how the latch of this invention functions.

As seen in FIG. 1 a motor-vehicle headrest support S provided with padding or upholstery indicated schematically at U has a latch 10. The support S has a base K as well as a part A. The part A can move relative to the part K in a horizontal straight line in the directions y1 and y2 by means of posts 29 sliding in sleeves 15 formed on the base K. The part A can be shifted out of the starting or rest position shown in FIG. 1 into an advanced or collision-protection position shown in FIG. 2 by springs shown schematically in FIG. 2 at S, in which advanced position the part A is spaced forward of the base K and close to the head of the seat passenger. The part A is held according to FIG. 1 by the latch 10 against the spring force of the springs S in the rest position.

The latch 10 has a locking lever 11 that is held on support arms 33 at a pivot $G_1$ in such a manner that it can rotate about a lever axis a1 fixed to the base K. The lever axis a1 is formed by a pin 28 carried in the support arms 33. This pin 28 extends through a support seat (not shown) of the locking lever 11. The support arms 33 are permanently connected to the base part K. A first arm 13 of the locking lever 11 cooperates with an actuator 16. A second lever arm 12 of the two-armed locking lever 11 is provided on its outer end with a seat 14 through which a pivot pin 30 extends.

Two links 20 have front ends 21 forming journals 44 for a pivot pin 23 secured in the headrest part A. The links 20 with the headrest part A form (See FIG. 1A) a pivot G3 with an axis a3. The links 20 are held on the headrest part A in such a manner that they can pivot about the axis a3. A rear end of each link 20 has a journal 34 through which the pivot pin 30 extends parallel to the pin 23. The lever arm 13 and actuation lever 20 form a pivot G2 with a pivot axis a2. This pivot G2 can pivot about the lever axis a1.

The previously mentioned springs S urge the headrest part A with a force F1 in the direction y1. The spring force F1 of the springs S is transferred to the pivot G2 of the lever arm 13 of the locking lever 11 via the links 20. A component F2 of the force F1 creating a torque M in the locking lever 11 has different magnitudes as a function of the pivot angle α between a connecting line 11 of the force application point of the return force F1 on the pivot G1 and a connecting line 12 from the pivot G2 to the pivot G1. If the angle α is very small, the component F2 is then also relatively small relative to F1. A significant part of the force F1 is applied in this instance to the pivot G1. In a corresponding manner torque M and a resulting holding force F3 that is to be supplied by actuator 16 is also small.

According to FIG. 1 the angle α is small, for example less than 20°, in the starting position of the latch 10. The component F2 therefore generates a relatively small torque M in locking lever 11 about lever axis a1 in the direction u1.

Pivoting of the locking lever 11 is prevented according to FIG. 1 by a latch pin 17 (shown in FIG. 2) of an actuator 16, that is located in the retaining position of the latch in the path of the lever arm 12. For example, the pin 17 can cooperate positively with the latch formation 45 of the arm 12, thus preventing movement of lever arm 12.

The holding force F3 that is necessary for preventing pivoting of the locking lever 11 against the torque M is a function of the magnitude of force F2, of a distance r1 (see FIG. 1A) between the pivot G2 and the pivot G1 and of a distance r2 between the formation 45 and the pivot G1. The greater r2 is in relation to r1, the lesser holding force F3 is.

The pin 17 can move axially in directions $x_1$ and $x_2$, for instance by a solenoid of the actuator 16. In order to disengage the latch pin 17 and the latch formation 45 a short stroke x2 is all that is necessary. The latch pin 17 can be moved between an extended blocking position and a retracted unblocking position. In the retracted position the latch pin 17 is moved out of the path of the lever arm 13. For example, the latch pin 17 can be moved by the electromagnet into the unblocking position and subsequently moved back into the blocking position by an unillustrated return spring.

As soon as the latch pin 17 is no longer in engagement with the latch formation, the torque M caused by the force F2 pivots the locking lever 11 in a direction u1. The pin 30 of pivot G2 is moved in a circular arc around the pivot pin 28 of the pivot G1. The links 20 move the pivot G3 in the direction y1, and the headrest part A movably slides in the direction y1 into the forward safety position shown in FIG. 2. In this position the headrest part A can be fixed in a manner that is not shown so that an undesired rearward movement of the headrest part A into the rest position is not possible.

Figure 2:
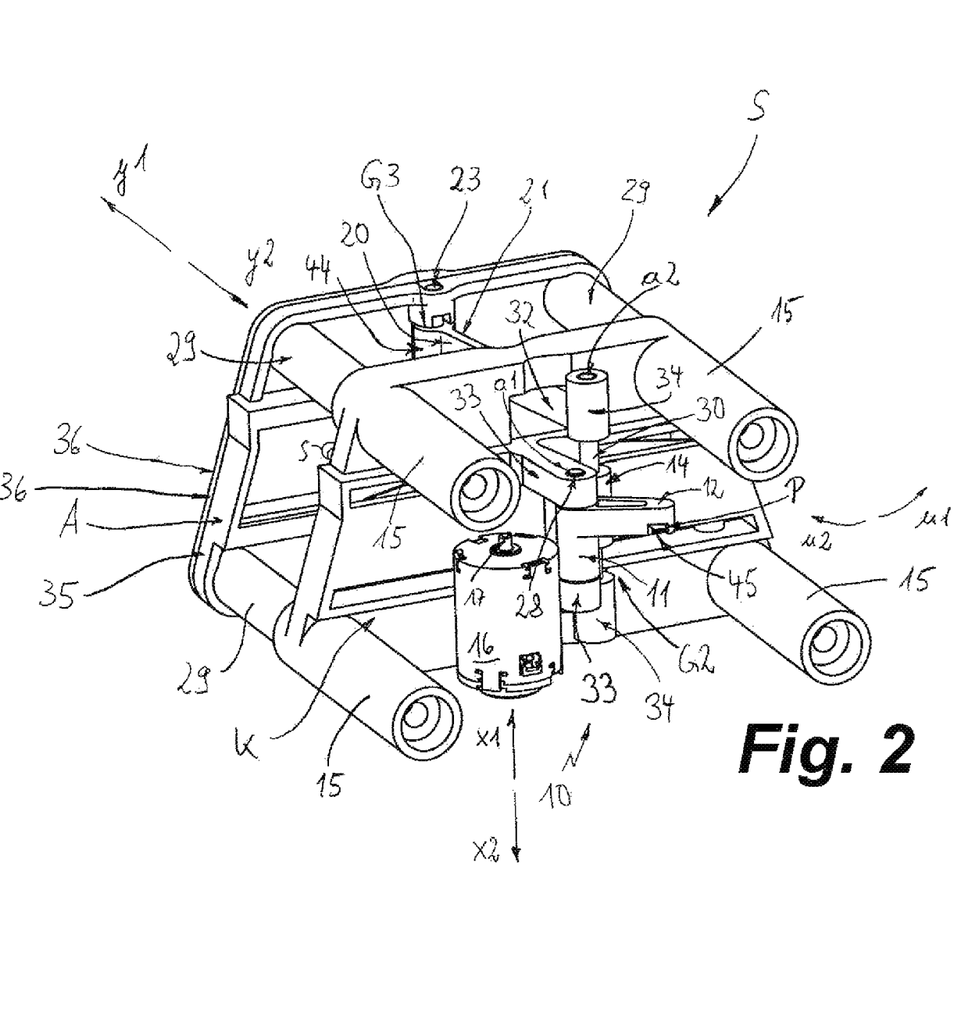
FIG. 2 is a perspective view like FIG. 1 showing the headrest assembly in the advanced position.

The headrest part A can be moved back from the safety position shown in FIG. 2 counter to the force of the springs S into the rest position according to FIG. 1. This action pivots the locking lever 11 in the direction u2. Angled surfaces P of the formation 45 contact the latch pin 17 and push the latch pin 17 into a seat of the latch formation 45. When the latch pin 17 is in the seat of the latch formation 45, the latch 10 is again held in the rest position. After movement of the latch 10 into the freeing position return into the retaining position is possible as often as desired. The head support S can therefore be put back into the rest position even after a movement of headrest part A into the advanced position and be reused.

Figure 3:
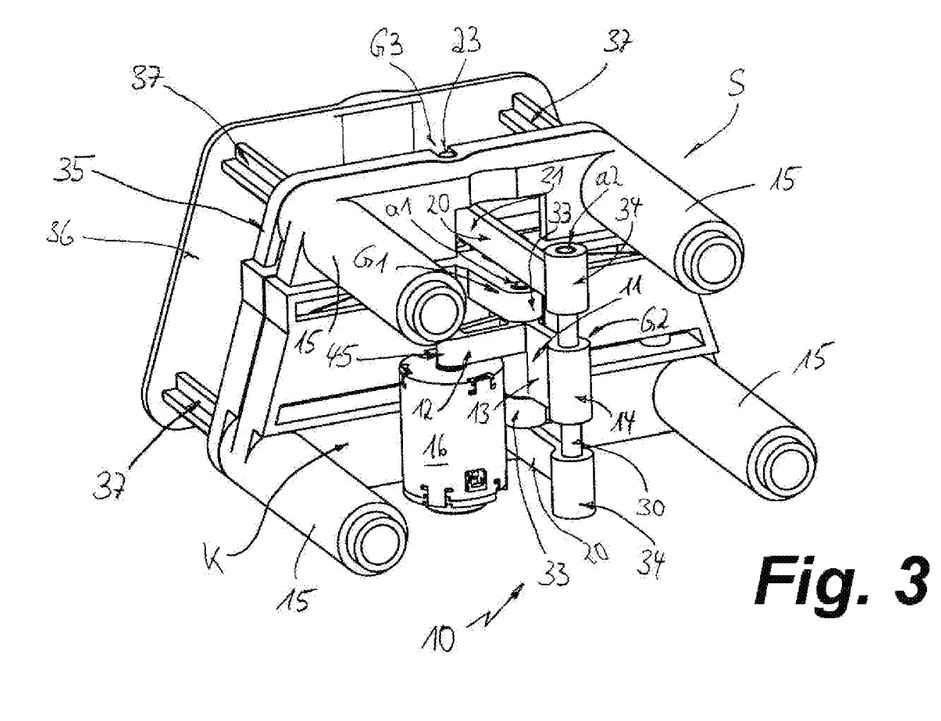
FIGS. 3 and 4 are views like respective FIGS. 1 and 2 but showing a front plate of the headrest in an outer position.
Figure 4:
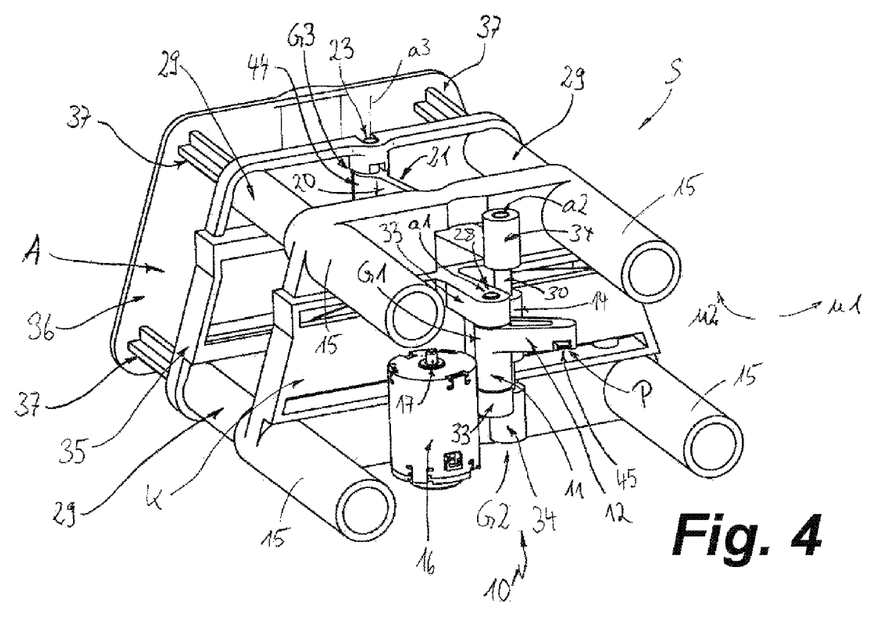

The headrest part A comprises as shown in FIG. 3 a back plate 35 and a front plate 36. The front plate 36 is supported by four x-section posts 37 on the back plate 35 in such a manner that it can move relative thereto in the directions y1 and y2 in this manner and be fixed in different relative positions. Thus, it is possible to adjust the position of the front face of the front plate 36 for passenger comfort. The relative position of front plate 36 relative to back plate 35 is also retained in the front crash position of the head support according to FIG. 4 and can be reset and locked in place by unillustrated means.

FIG. 5 to 8 show another embodiment of the latch. Here the locking lever 11 is a one-armed lever that is supported by two stub shafts 42 in a housing 43 (shown only schematically in FIG. 6). The shafts 42 are permanently connected to the locking lever 11 and define the lever axis 1a. Actuation levers 31a and 31b flank the locking lever 11 (see FIG. 6). The lever axis al of the locking lever 11 and the pivot axis a2 of the actuation levers 31a and 31b are parallel. The locking lever 11 is centered on a plane E1, the actuation lever 31a on a plane E2, and the actuation lever 31b on a plane E3, all parallel to each other.

Figure 6:
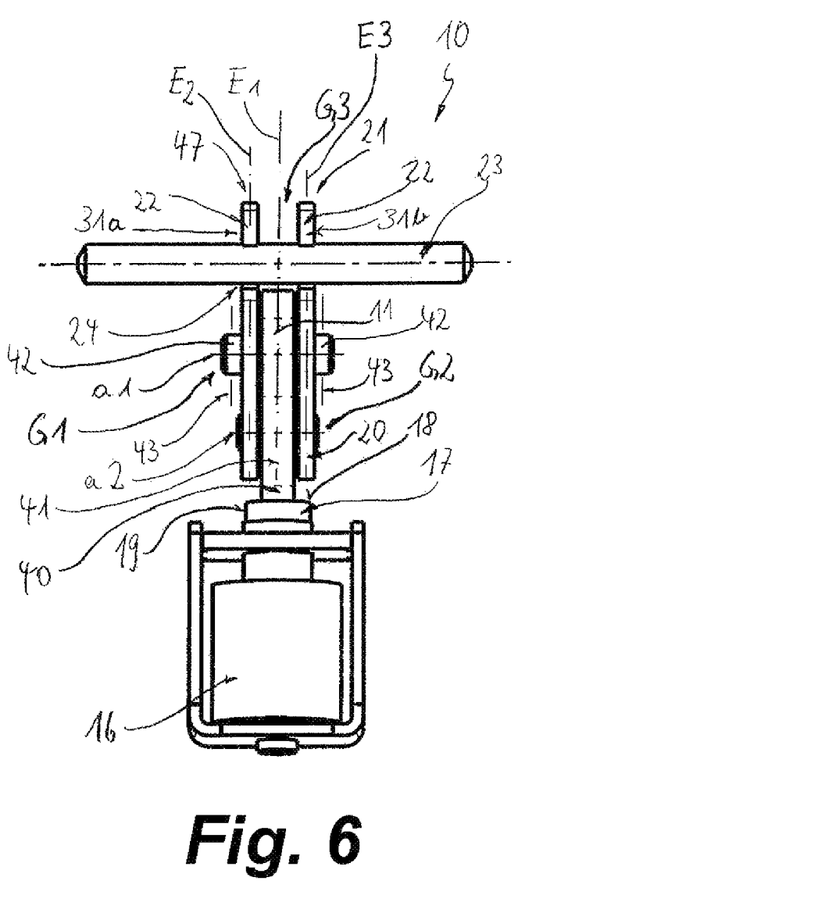
FIG. 6 is side view taken in the direction of arrow VI of FIG. 5.

As result of the parallel arrangement as well as the construction of locking lever 11 and of actuation levers 31 as flat plates, the latch 10 takes up very little space, as can be seen in particular in FIG. 6. The actuation levers 31a and 31b are coupled to one another for joint synchronous rotation, for example in a manner that is not shown.

Figure 5:
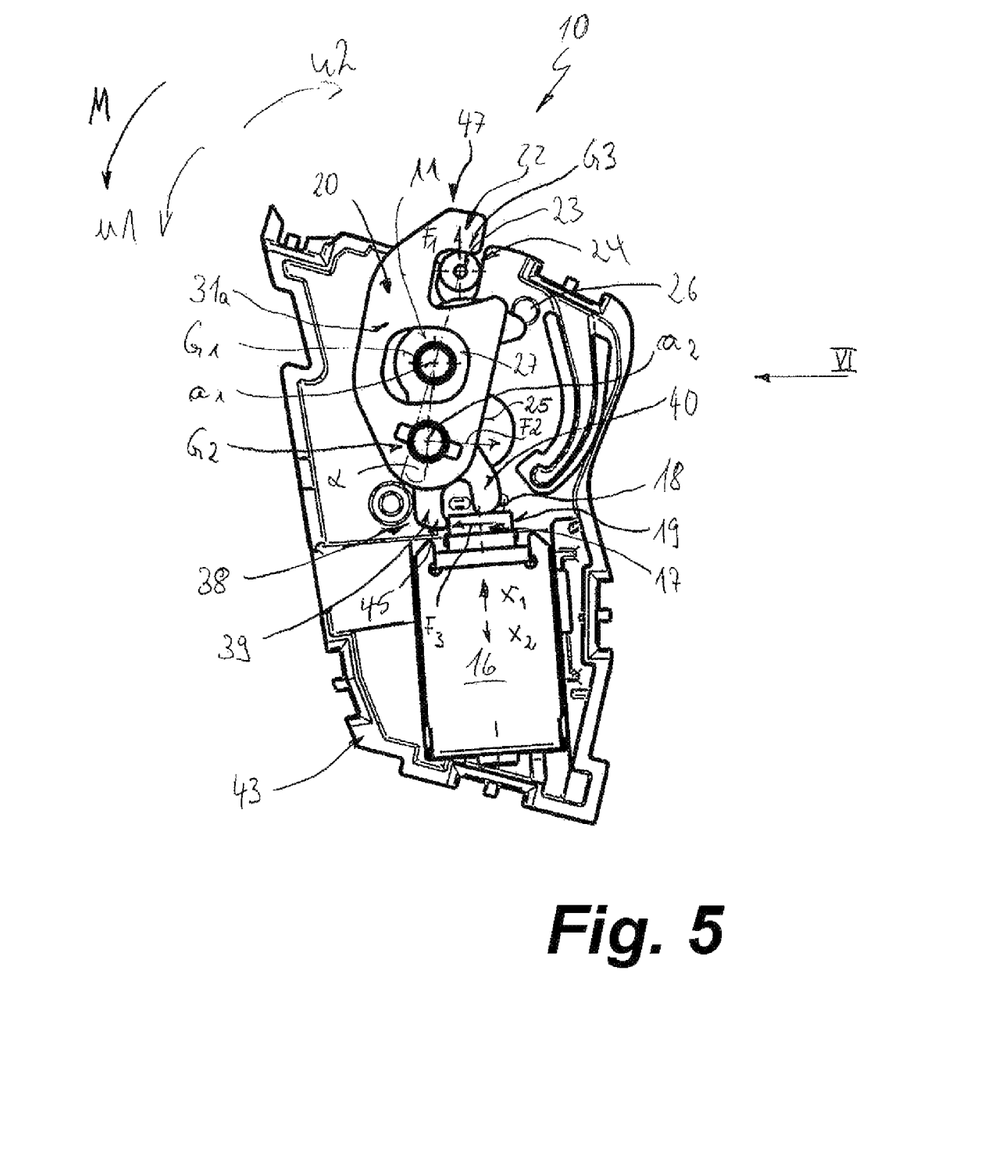
FIG. 5 is a side view of another latch according to the invention.

The actuation levers 31a and 31b are each formed with a window 27 through which the respective shaft 42 of the locking lever 11 extends with some play. The actuation levers 31a and 31b, which are parallel to each other, are pivoted on the locking lever 11 at a pivot $G_2$ in such a manner that they can pivot about the axis a2. Only one actuation lever 31a is shown in FIG. 5. Thus, the axis a2 can orbit limitedly about the lever axis a1.

A front end 47 of the actuation lever 31 is formed like a hook with a mouth 22 according to FIG. 5 surrounding the pivot pin 23 firmly connected to the headrest part A. A spring force F1 acting on the pivot pin 23 is transmitted through the actuation lever 31 to the pivot G2. The pivot pin 23 is also engaged in a recess 24 of the actuation lever 31 and rests in point contact on an inner surface of the recess 24 so that part of the force F1 can be transferred from the pivot pin 23 to the actuation lever 31.

A part F2 of the force F1 is transferred from actuation lever 31 onto locking lever 11 and produces a torque M in the locking lever 11 that as shown in FIG. 5 is counterclockwise in the direction $u_1$. The size of the force F2 in comparison to the force F1 is a function of the angle a between a connecting line between pivots G3 and G1 and a connecting line between pivots G2 and G1. The smaller the angle $\alpha$, the smaller the force F2 is in comparison to force F1. According to FIG. 5 the angle $\alpha$ is very small in the rest position of the latch. For this reason the torque M acting on the locking lever 11 is also very small. The holding force F3 to be supplied by actuator 16 can also be very small to act against the small torque M in the locking lever 11.

According to FIG. 5 a rear end 38 of the locking lever 11 has two fingers 39 and 40. The finger 39 rests on an end face 19 and the finger 40 rests on a side surface 18 of the latch pin 17. In this manner pivoting of locking lever 11 is prevented by the engagement of the fingers 39 and 40 and of the latch pin 17 in spite of torque M.

The pivot G2 is between the pivot G1 and the rear end 38 of the locking lever 11. A holding force F3 exerted by the latch pin 17 on the locking lever 11 therefore has a greater lever arm than a force F2 exerted by the actuation lever 31 on the locking lever 11. FIG. 5 clearly shows that in the blocking position of the pin 17 the axis a2 and where the pivot pin 23 bears on the contact region G3 are within 180° of each other, so that the force F1 in direction y1 will urge the lever 11 counterclockwise to push its arm 39 against the side surface of the pin 17.

Figure 7:
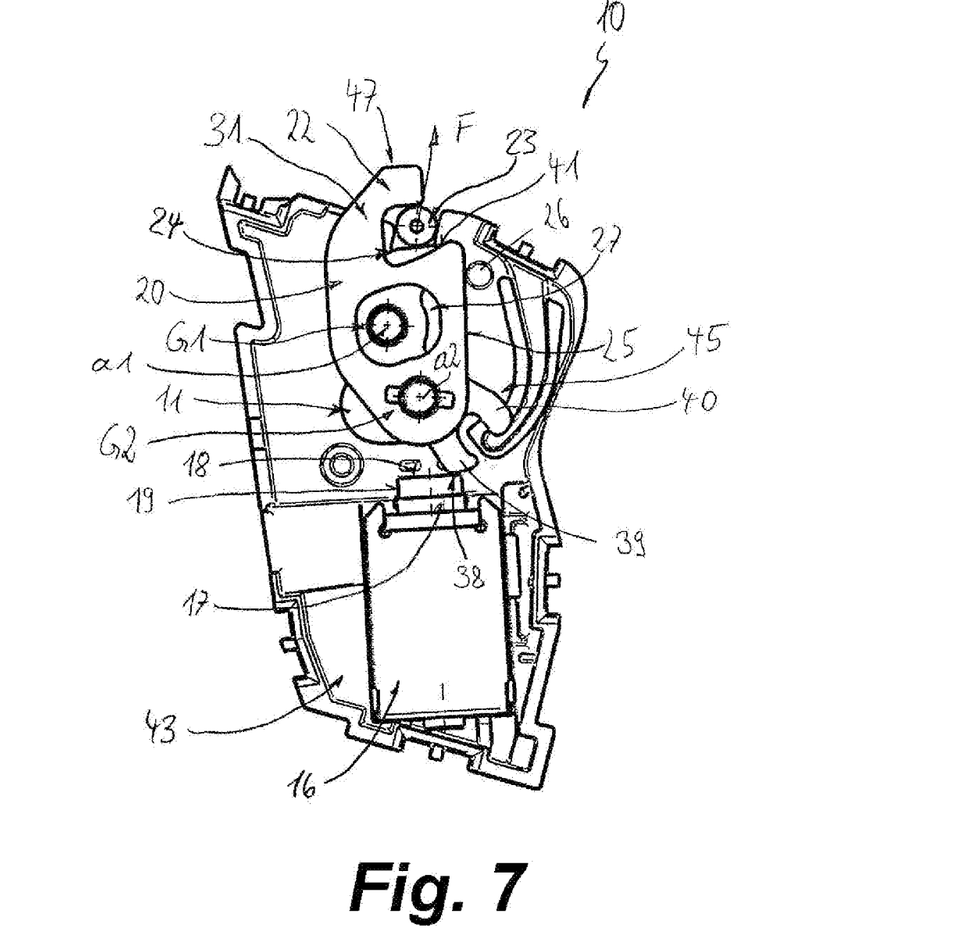
FIGS. 7 and 8 are views like FIG. 5 as the structure moves into the releasing position.
Figure 8:
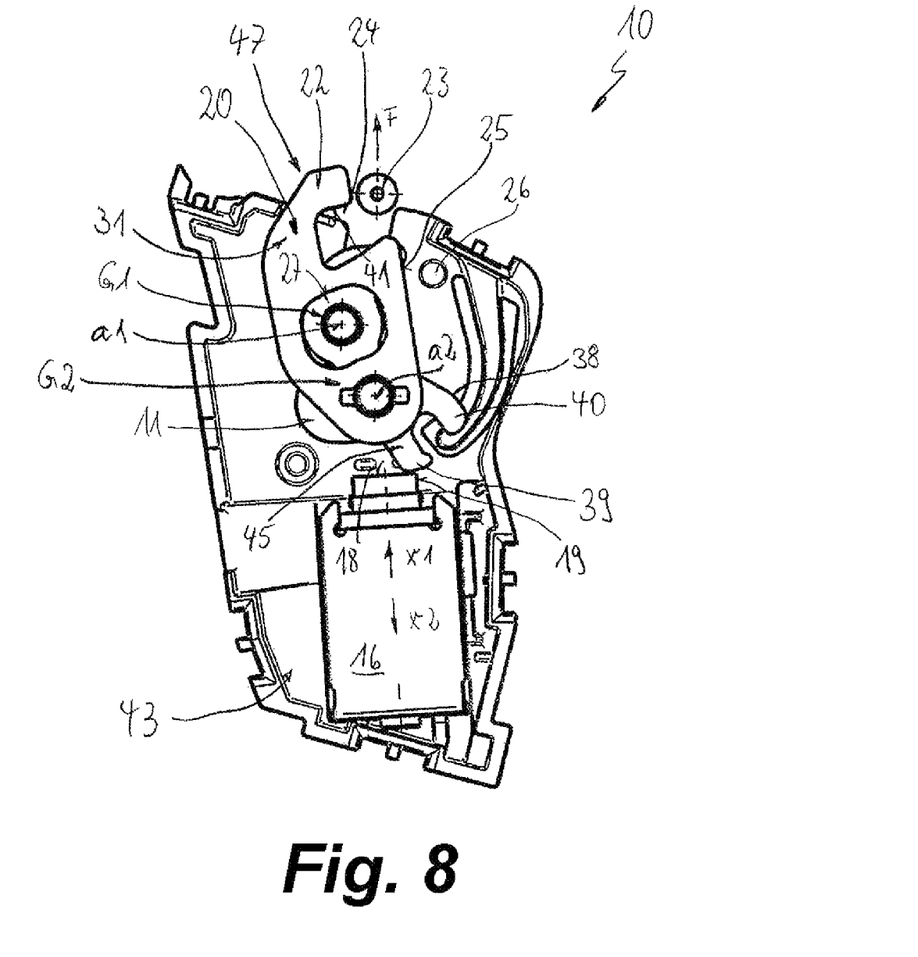

As soon as the latch pin 17 of actuator 16 is moved into the retracted position shown in FIGS. 7 and 8, the locking lever 11 pivots on account of the torque M in the direction $u_1$. A control surface 25 of the actuation lever 31 comes in contact with a stop 26 so that the actuation lever 31 is pivoted in the direction $u_1$ about the pivot pin a2. According to FIG. 5 this action moves the shaft 23 out of the recess 24. The hook 22 no longer engages around the shaft 23, and the shaft 23 can move forward out of the recess 24. The headrest part A can move toward the head of the vehicle passenger under the force of its springs, in a manner that is not shown.

After release, the latch can be readily returned into the rest position according to FIG. 2. Thus, the latch can be used as often as desired.

It is also worth noting that the actuation lever 31 or locking lever 11 can be prevented from pivoting into the safety position of apparatus 10 by a catch (not shown). This can prevent the actuation or locking lever 31 from moving back in an undesired manner into the rest position and holds the headrest part A solidly in the rest position. This unillustrated catch will of course have to be manually released in order to restore the headrest assembly to the rest position.

We claim:

1. A collision-responsive latch for securing a head contact part of a vehicular headrest to a support, the latch comprising:

guides between the head-contact part and the support for movement of the head-contact part relative to the support between a rest position and an advanced position;

a lever pivotal on the support about a lever axis between a retaining position and a freeing position and provided with a first arm connectable to the head-contact part and offset from the lever axis with a latch formation;

a link offset from the lever axis, connected with the first arm, and including at least one contact region, the contact region being operatively engaged with the head-contact part in the retaining position to prevent shifting of the head-contact part from the rest position into the advanced position;

an actuator on the support having a part directly engageable with the latch formation and displaceable relative to the support and to the lever in the event of a collision from a blocking position directly engaging the latch formation and preventing pivoting of the lever about the lever axis in at least one direction out of the retaining position toward the freeing position into an unblocking position disengaged from the latch formation and permitting pivoting of the lever about the lever axis in the one direction out of the retaining position toward the freeing position; and spring means for urging the head-contact part from the rest position into the advanced position and for thereby pressing the head-contact part against the contact region with a force pulling the link and applying torque to the lever in the one direction and for thereby directly engaging the latch formation with the actuator part in the blocking position, movement of the actuator part into the unblocking position thereby disengaging the actuator part from the latch formation and freeing the lever to pivot into the freeing position so the head-contact part can move into the advanced position.

2. The latch defined in claim 1 wherein the link has one end pivoted on the lever at the contact region and an opposite end pivoted on the head-contact part.

3. The latch defined in claim 1 wherein the link is pivotal on the lever about a link axis.

4. The latch defined in claim 3 wherein the link and lever axes are parallel to but offset from each other.

5. The latch defined in claim 4 wherein the link and lever lie in respective parallel planes perpendicular to the axes.

6. The latch defined in claim 1 wherein the link has a hook forming the contact region and releasably engageable with the head-contact part.

7. The latch defined in claim 6, further comprising an abutment engageable with the link on pivoting of the lever out of the retaining position to disengage the hook from the head-contact part.

8. The latch defined in claim 1 wherein the lever is a one-arm lever.

9. The latch defined in claim 1 wherein the link is a two-arm lever having one arm forming the contact region and another arm engageable with the part.

10. The latch defined in claim 9 wherein the latch formation is further from the lever axis than the contact region.

11. The latch defined in claim 1, further comprising a housing holding the lever and actuator.

12. A collision-responsive latch for securing an head-contact part of a headrest relative to a support, the latch comprising:

guides between the head-contact part and the support for movement of the head-contact part relative to the support between a rest position and an advanced position;

a lever pivotal on the support about a lever axis between a retaining position and a freeing position and provided with a first arm connectable to the head contact part and offset from the lever axis with a latch formation;

a link offset from the lever axis, connected with the first arm, and including at least one contact region, the contact region being operatively engaged with the head-contact part in the retaining position to prevent shifting of the head-contact part from the rest position into the advanced position;

an actuator on the support having a part directly engageable with the latch formation and displaceable in the event of a collision relative to the support and to the lever from a blocking position directly engaging the latch formation and preventing pivoting of the lever about the lever axis in at least one direction out of the retaining position toward the freeing position into an unblocking position disengaged from the latch formation and permitting pivoting of the lever about the lever axis in the one direction out of the retaining position toward the freeing position; and spring means for urging the head-contact part from the rest position into the advanced position and for thereby engaging the head-contact part directly with the contact region, the lever axis, the contact region, and the latch formation being relatively so oriented that such pressing of the head-contact part by the spring means against the contact region applies torque to the lever in the one direction and thereby engages the latch formation directly with the actuator part in the blocking position, movement of the actuator part into the unblocking position thereby disengaging the actuator part from the latch formation and thereby freeing the lever to pivot into the freeing position so the head-contact part can move into the advanced position, a line through the lever axis and where the contact region of the link operatively engages the lever forming an angle of less than 45° with a connecting line extending from the lever axis through the contact region.

13. The latch defined in claim 12 wherein the angle is about 20°.

* * * * *